United States Patent
Lin et al.

(10) Patent No.: US 9,718,192 B2
(45) Date of Patent: Aug. 1, 2017

(54) SYSTEM FOR AUTOMATICALLY AND PRECISELY POSITIONING ROBOTIC ARM AND METHOD THEREOF

(71) Applicant: NATIONAL TAIPEI UNIVERSITY OF TECHNOLOGY, Taipei (TW)

(72) Inventors: Hsien I Lin, Taipei (TW); Yu Che Huang, Taipei (TW)

(73) Assignee: NATIONAL TAIPEI UNIVERSITY OF TECHNOLOGY, Taipei (TW)

(*) Notice: Subject to any disclaimer, the term of this patent is extended or adjusted under 35 U.S.C. 154(b) by 0 days.

(21) Appl. No.: 14/748,250

(22) Filed: Jun. 24, 2015

(65) Prior Publication Data
US 2016/0375584 A1    Dec. 29, 2016

(51) Int. Cl.
B25J 9/16    (2006.01)
G01B 21/04    (2006.01)

(52) U.S. Cl.
CPC .......... *B25J 9/1694* (2013.01); *B25J 9/1633* (2013.01); *B25J 9/1692* (2013.01); *G01B 21/042* (2013.01); *G05B 2219/39021* (2013.01); *G05B 2219/39024* (2013.01); *Y10S 901/09* (2013.01); *Y10S 901/46* (2013.01)

(58) Field of Classification Search
CPC ...... B25J 9/1692; B25J 9/1697; B25J 9/1633; B25J 9/1694; G01B 21/042; G01B 11/002; G05B 2219/37555; G05B 2219/39015; G05B 2219/39021; G05B 2219/39024; G05B 2219/40625; Y10S 901/09; Y10S 901/46
See application file for complete search history.

(56) References Cited

U.S. PATENT DOCUMENTS

| | | | | |
|---|---|---|---|---|
| 5,177,563 A * | 1/1993 | Everett | ................. | B25J 9/1692 356/621 |
| 5,471,312 A * | 11/1995 | Watanabe | .......... | G05B 19/4015 347/256 |
| 5,687,293 A * | 11/1997 | Snell | ...................... | B25J 9/1692 318/568.13 |
| 7,899,577 B2 * | 3/2011 | Ban | ........................ | B25J 9/1692 318/568.11 |
| 7,904,202 B2 * | 3/2011 | Hoppe | ................... | B25J 9/1692 700/245 |
| 8,918,210 B2 * | 12/2014 | Kagawa | ................ | B25J 9/1692 318/568.11 |

(Continued)

*Primary Examiner* — Jason Holloway
(74) *Attorney, Agent, or Firm* — Chih Feng Yeh; Huntington IP Consulting Co., Ltd.

(57) ABSTRACT

The present disclosure illustrates a system for automatically and precisely positioning a robotic arm and method thereof. A control computing apparatus of the present disclosure controls a probe of the robotic arm to touch one of the positioning devices, and acquires a moment variation of each of the axes from a moment sensing device of the robotic arm, and then computes the distance between a geometric center of the touched positioning device and a coordinate origin according to a geometric feature of the touched positioning device, and then positions the robotic arm according to the moment variations of the axes and the distance between the geometric center of the touched positioning device and the coordinate origin. Therefore, the technical effect of quickly, precisely positioning the robotic arm without the error accumulation can be achieved.

10 Claims, 8 Drawing Sheets

(56) References Cited

U.S. PATENT DOCUMENTS

| | | | | |
|---|---|---|---|---|
| 9,050,728 B2* | 6/2015 | Ban | ........................ | B25J 9/1697 |
| 2004/0078114 A1* | 4/2004 | Cordell | .................. | B25J 9/1692 |
| | | | | 700/258 |
| 2004/0251866 A1* | 12/2004 | Gan | ....................... | B25J 9/1692 |
| | | | | 318/568.11 |
| 2007/0299557 A1* | 12/2007 | Watanabe | .............. | B25J 9/1656 |
| | | | | 700/250 |
| 2008/0004750 A1* | 1/2008 | Ban | ........................ | B25J 9/1692 |
| | | | | 700/245 |
| 2008/0188986 A1* | 8/2008 | Hoppe | ................... | B25J 9/1692 |
| | | | | 700/263 |
| 2012/0239194 A1* | 9/2012 | Kagawa | ................. | B25J 9/1692 |
| | | | | 700/254 |
| 2014/0156072 A1* | 6/2014 | Ban | ........................ | B25J 9/1697 |
| | | | | 700/254 |
| 2014/0343729 A1* | 11/2014 | Fudaba | .................... | B25J 13/00 |
| | | | | 700/261 |
| 2016/0184996 A1* | 6/2016 | Ishige | ................... | B25J 9/1692 |
| | | | | 700/254 |

* cited by examiner

SYSTEM FOR AUTOMATICALLY AND PRECISELY POSITIONING ROBOTIC ARM AND METHOD THEREOF

BACKGROUND OF RELATED ART

Technical Field

The present disclosure relates to a positioning system and method thereof, more particularly to a system for automatically and precisely positioning a robotic arm and a method thereof.

Background Art

When a robotic arm is moved, a traditional control apparatus just provides a relative measurement position but not an absolute measurement position, and it means that an application which depends on absolute coordinate of the control apparatus for correct operation requires further complicated computation to continuously maintain a position track of the control apparatus. In addition, the control apparatus must be re-positioned periodically, or else the positioning error of the control apparatus will be accumulated continuously, it will become a risky condition for the application soon.

An optical type positioning system is usually adopted to position the robotic arm in an operating space of the robotic arm. During operation of the optical type positioning system, a workpiece or positioning auxiliary tool must be marked with optical positioning points for quickly positioning, and cameras must be installed as auxiliary apparatuses. These cameras must be calibrated in advance to obtain intrinsic parameters and extrinsic parameters for reducing image distortion.

The intrinsic parameters are generated based on a pin hole model, and a zoom lens with different focus length has different intrinsic parameters. During the positioning procedure of the optical type positioning system, an intrinsic parameter calibration is performed first and the obtained intrinsic parameters are multiplied with the coordinate matrix of the robotic arm and extrinsic parameter matrixes of the cameras to obtain coordinates of the optical positioning points, so that the error accumulation is easily generated.

To sum up, the problems of complicated robotic arm positioning process and easily generating error accumulation exist in the traditional positioning technology for long time, and what is need is to provide an improved technology solution to solve the problems.

SUMMARY

In order to solve the problems of the complicated robotic arm positioning process and easily generating error accumulation, the present disclosure illustrates a system for automatically and precisely positioning the robotic arm and method thereof.

In the present disclosure, the system for automatically and precisely positioning a robotic arm includes the robotic arm, at least three positioning devices and a control computing apparatus. The robotic arm further includes a moment sensing device and a probe.

The moment sensing device of the robotic arm is disposed at a face of flange on a front end of the robotic arm, and the moment sensing device is configured for sensing moments of at least six axes. The probe of the robotic arm is disposed on the moment sensing device. The at least three positioning devices are disposed on an operating plane in an operating space of the robotic arm.

The control computing apparatus is used to control the probe of the robotic arm to touch one of the positioning devices. When the probe touches one of the positioning devices, the moment sensing device of the robotic arm acquires a moment variation of each of axes and provides the moment variations to the control computing apparatus. The control computing apparatus computes a distance between a geometric center of the touched positioning device and a coordinate origin according to a geometric feature of the touched positioning device, and then precisely positions the robotic arm according to the moment variations of the axes and the distance between the geometric center of the positioning device and the coordinate origin.

The method for automatically and precisely positioning a robotic arm, in accordance with the present disclosure, includes following steps.

First, a robotic arm having at least four degrees of freedom is provided, and a moment sensing device is disposed at a face of flange on a front end of the robotic arm to sense moments of at least six axes, and a probe is disposed on the moment sensing device. Next, at least three positioning devices are disposed on an operate plane in an operating space of the robotic arm. Next, a control computing apparatus is used to control the probe of the robotic arm to touch one of the positioning devices, and the moment sensing device of the robotic arm is used to acquire a moment variation of each of the at least six axes. Next, the control computing apparatus computes a distance between a geometric center of the touched positioning device and a coordinate origin according to a geometric feature of the touched positioning device. Next, the control computing apparatus positions the robotic arm according to the moment variations of the axes and the distance between the geometric center of the touched positioning device and the coordinate origin. Finally, the above three steps are repeatedly performed to continuously verifying an offset of the robotic arm, to precisely position the robotic arm.

The difference between the traditional technology, and the system and method of the present disclosure is that the control computing apparatus of the present disclosure can control the probe of the robotic arm to touch one of the positioning devices, and acquire a moment variation of each of the axes from the moment sensing device of the robotic arm, and then compute the distance between the geometric center of the touched positioning device and the coordinate origin according to a geometric feature of the touched positioning device, and then position the robotic arm according to the moment variations of axes and the distance between the geometric center of the touched positioning device and the coordinate origin.

By applying the aforesaid technical solution, the present disclosure can achieve the technical effect of quickly, precisely positioning the robotic arm without the error accumulation.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION

Figure 1A:
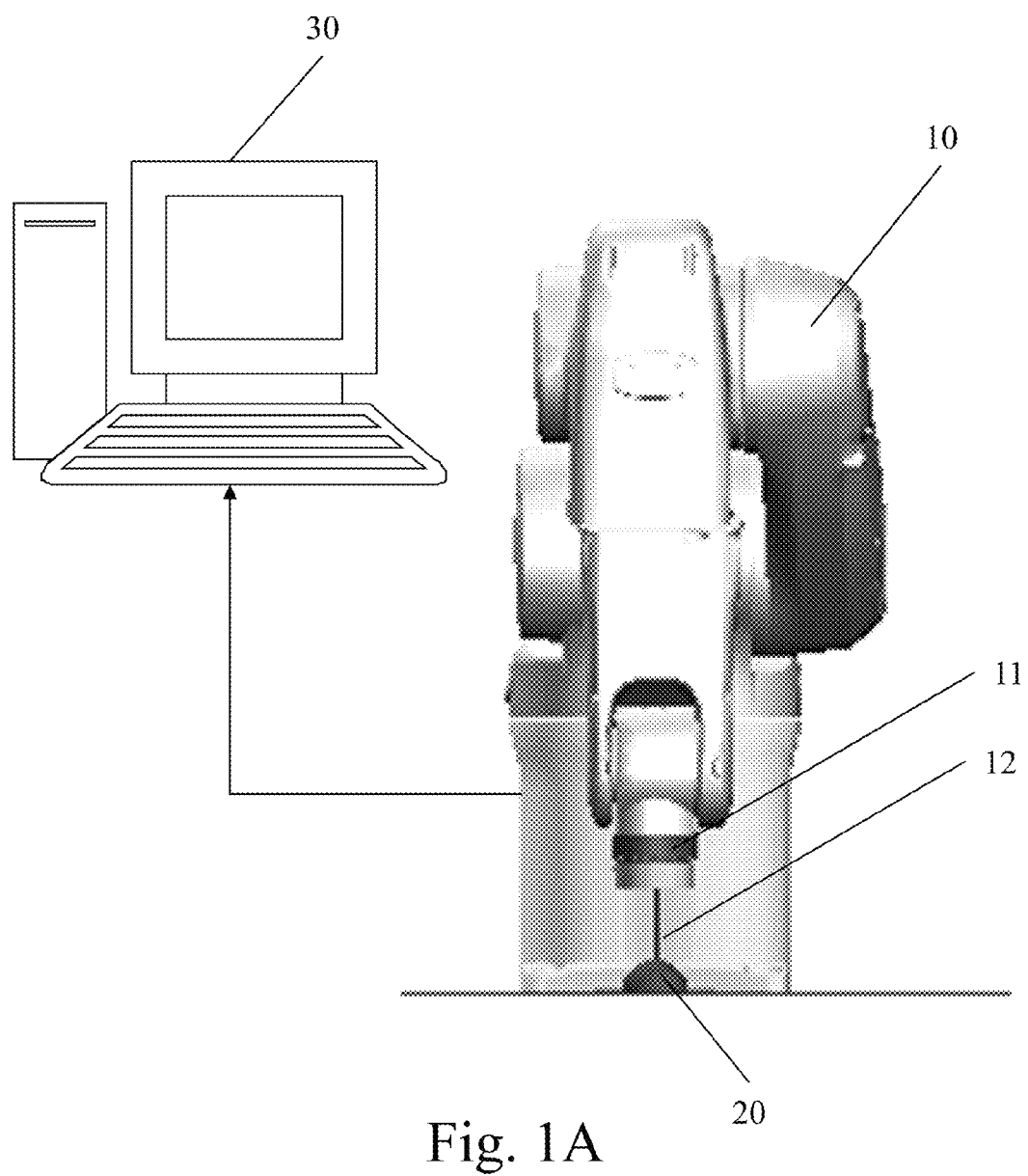
FIG. 1A and FIG. 1B illustrate system structural views of a system for automatically and precisely positioning a robotic arm of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 1B:
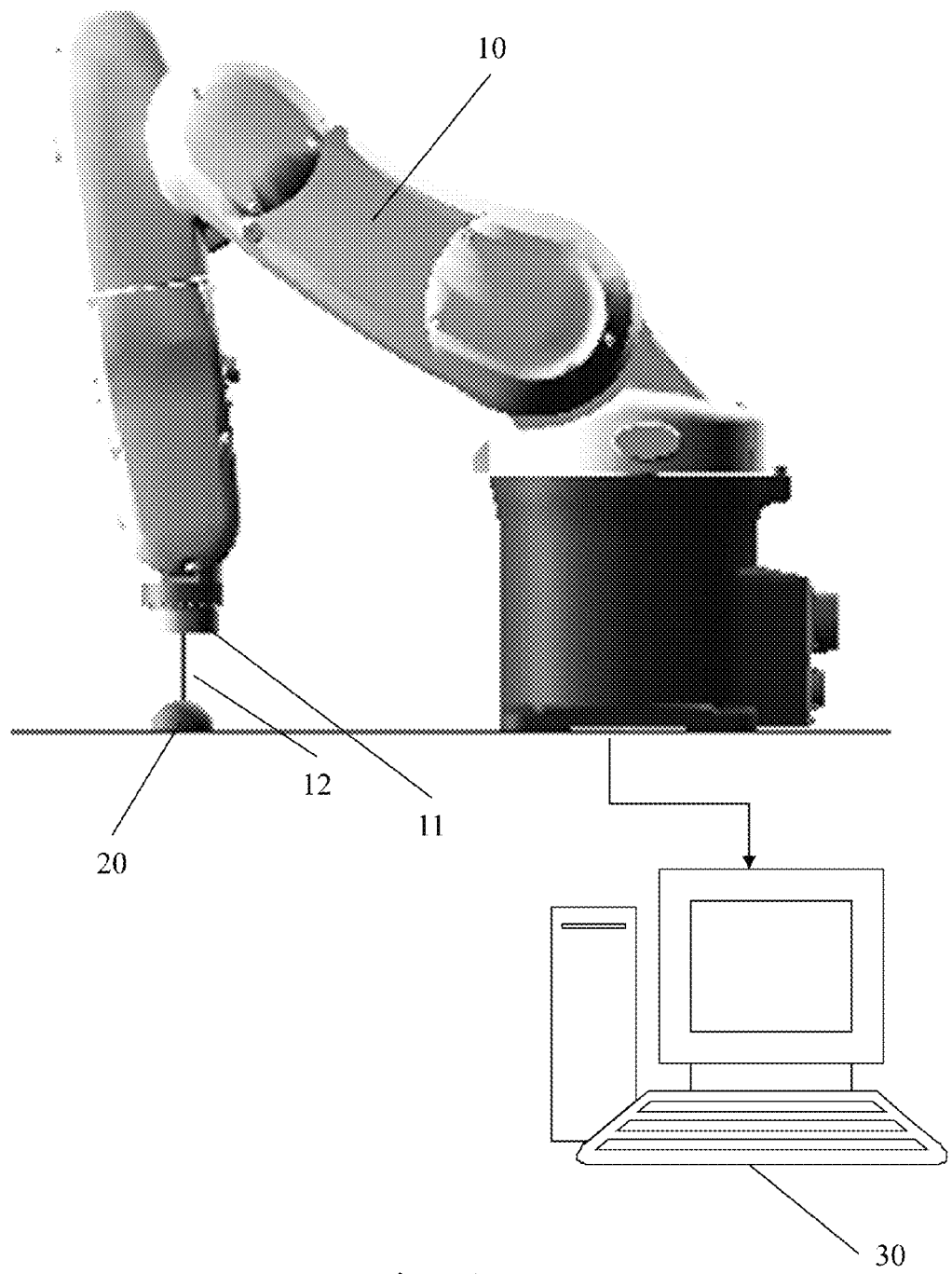

First, the system for automatically and precisely positioning the robotic arm disclosed in the present disclosure is described in following paragraph. Please refer to FIG. 1A and FIG. 1B which illustrate system structural views of a system for automatically and precisely positioning a robotic arm of the present disclosure.

The system for automatically and precisely positioning the robotic arm of the present disclosure includes a robotic arm 10, at least three positioning devices 20 and a control computing apparatus 30. The robotic arm 10 further includes a moment sensing device 11 and a probe 12.

The robotic arm 10 utilized in the present disclosure has at least four degrees of freedom. The moment sensing device 11 is disposed at a face of flange on a front end of the robotic arm 10, and the face of flange is an interface for installing different tool with the robotic arm 10. The moment sensing device 11 is configured to sense moments of at least six axes.

The probe 12 is disposed on the moment sensing device 11 and configured for touching the positioning device 20.

It is worth noting that the moment sensing device 11 is used to sense forces applied on a X axis, a Y axis and a Z-axis and torques applied on the X axis, the Y axis and the Z-axis. The probe 12 has a diameter smaller than one tenth of a diameter of the positioning device 20. At least three positioning devices 20 are disposed on a plane in an operating space of the robotic arm 10, and it is necessary to arrange these positioning devices 20 at different positions in the operating space of the robotic arm 10 and any three positioning devices 20 are non-collinear.

The control computing apparatus 30 is used to control the probe 12 of the robotic arm 10 to touch one of the positioning devices 20. When the probe 12 touches one of the positioning devices 20, the moment sensing device 11 of the robotic arm 10 acquires a moment variation of each of axes and provides the moment variations to the control computing apparatus 30. The control computing apparatus 30 computes a distance between a geometric center of the touched positioning device 20 and a coordinate origin according to a geometric feature of the touched positioning device 20, and then precisely positions the robotic arm 10 according to the moment variations of the axes and the distance between the geometric center of the touched positioning device 20 and the coordinate origin.

Figure 2:
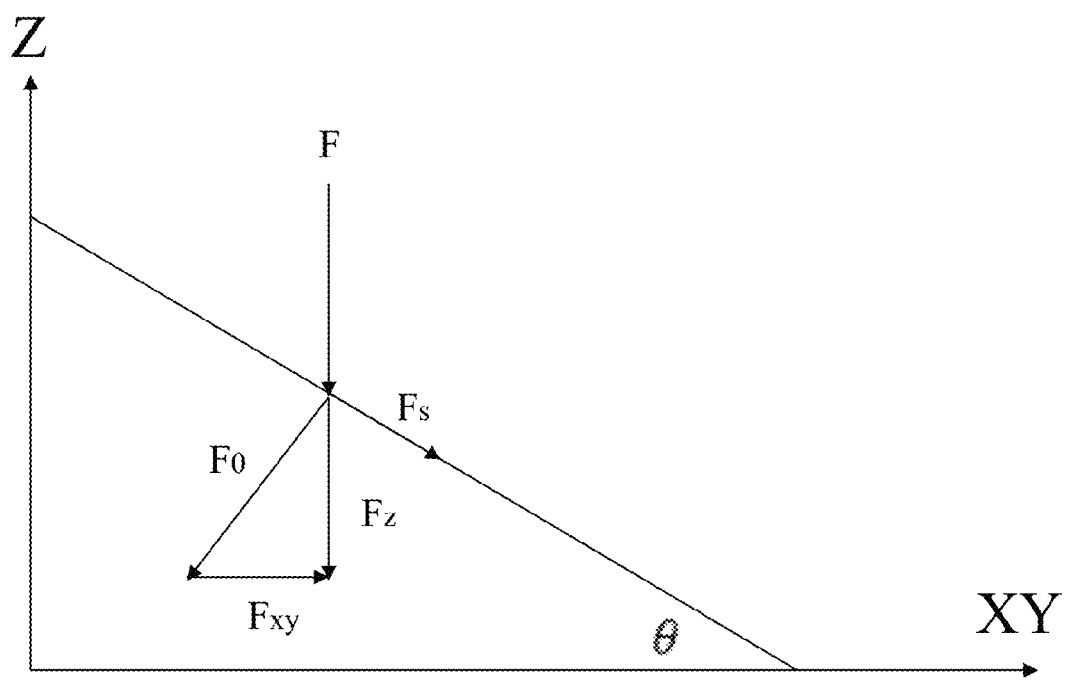
FIG. 2 illustrates a schematic view of an incline force analysis.

Next, please refer to FIG. 2 which illustrates a schematic view of an incline force analysis.

The control computing apparatus 30 computes the distance between the geometric center of the touched positioning device 20 and the coordinate origin according to the geometric features of the touched positioning device 20, and then precisely positions the robotic arm 10 according to moment variations of the axes and the distance between the geometric center of the touched positioning device 20 and the coordinate origin.

Before the control computing apparatus 30 computes the distance between the geometric center of the touched positioning device 20 and the coordinate origin according to the geometric feature of the touched positioning device 20, an incline force analysis for any normal vector on a surface of the positioning device 20 must be performed first. It is assumed that the surface of the touched positioning device 20 is an inclined plane with angle $\theta$ of inclination, the distances $d_{xy}$ and $d_z$ between any point of the positioning device 20 and a center point of the positioning device 20 can be obtained by below computation, and the robotic arm 10 can be precisely positioned based on the computed $d_{xy}$ and $d_z$.

When the probe 12 of the robotic arm 10 exerts a force F to touch any point on the surface of the positioning device 20, a slope of the surface of the positioning device 20 is $$\frac{\Delta_z}{\Delta_{xy}},$$

a counterforce generated on the surface of the positioning device 20 and perpendicular to the surface of the positioning device 20 is $F_0$, a surface friction force generated on the surface of the positioning device 20 and parallel to the surface of the positioning device 20 is $F_s$. When the probe 12 of the robotic arm 10 exerts the force F motionlessly and the surface of the positioning device 20 is smooth, the surface friction of the positioning device 20 approaches zero or can be ignored, and the counterforce $F_0$ can be separated a $F_{xy}$ component and a $F_z$ component along the XY axis and the Z axis, respectively, and ratio of the $F_{xy}$ and $F_z$ components is tan θ.

Figure 3A:
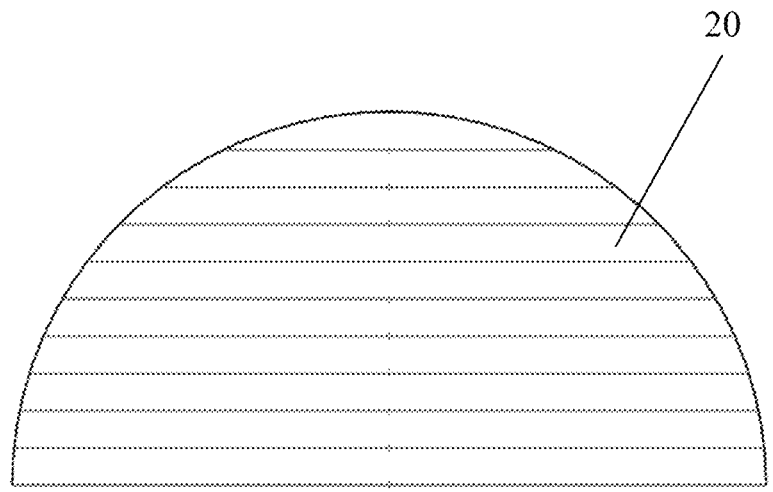
FIG. 3A and FIG. 3B illustrate perspective view and lateral view of a first embodiment of a positioning component for automatically and precisely positioning the robotic arm of the present disclosure, respectively.
Figure 3B:
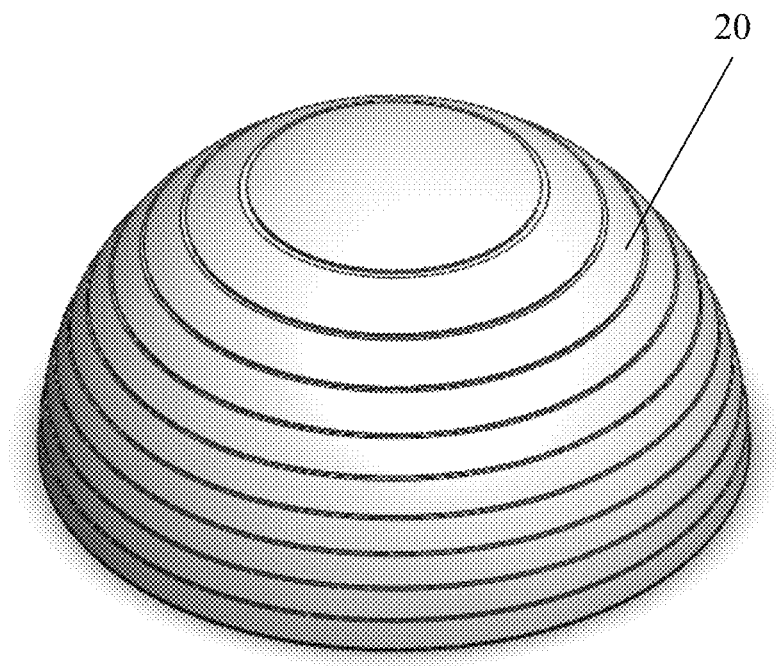
Figure 3C:
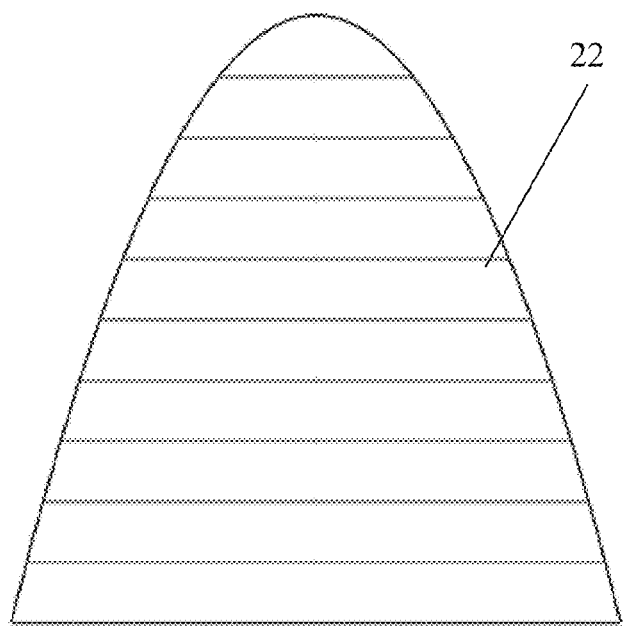
FIG. 3C and FIG. 3D illustrate perspective view and lateral view of a second embodiment of a positioning component for automatically and precisely positioning the robotic arm of the present disclosure, respectively.
Figure 3D:
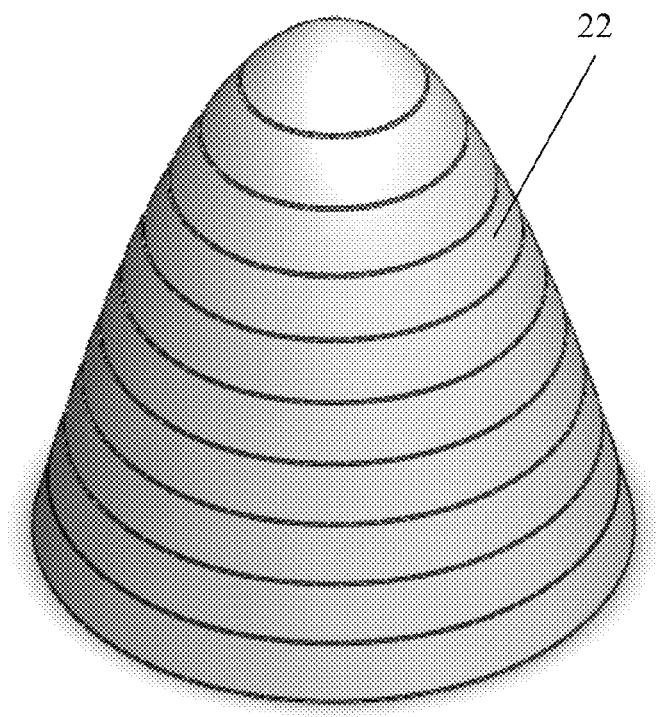
Figure 3E:
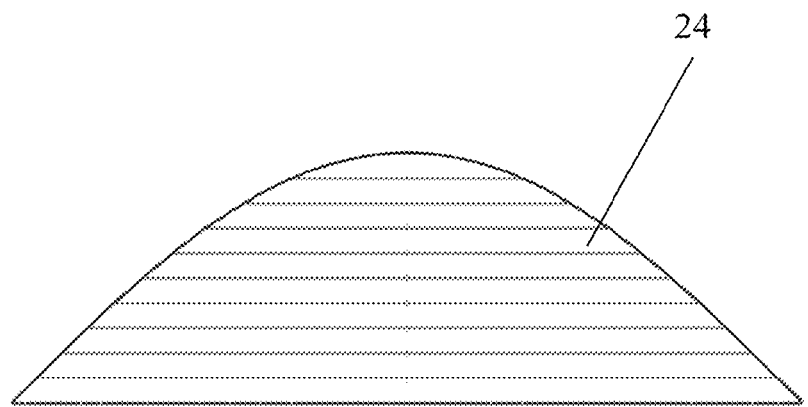
FIG. 3E and FIG. 3F illustrate perspective view and lateral view of a third embodiment of a positioning component for automatically and precisely positioning the robotic arm of the present disclosure, respectively.
Figure 3F:
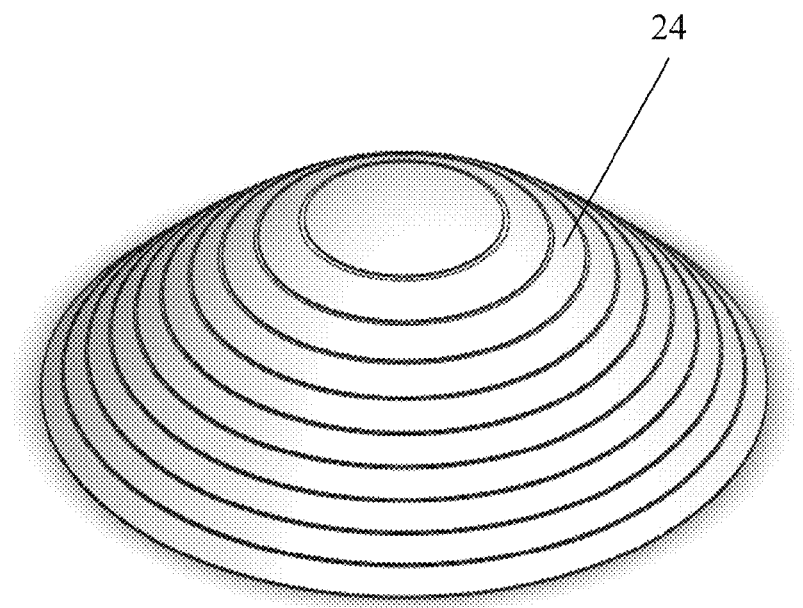
Figure 3G:
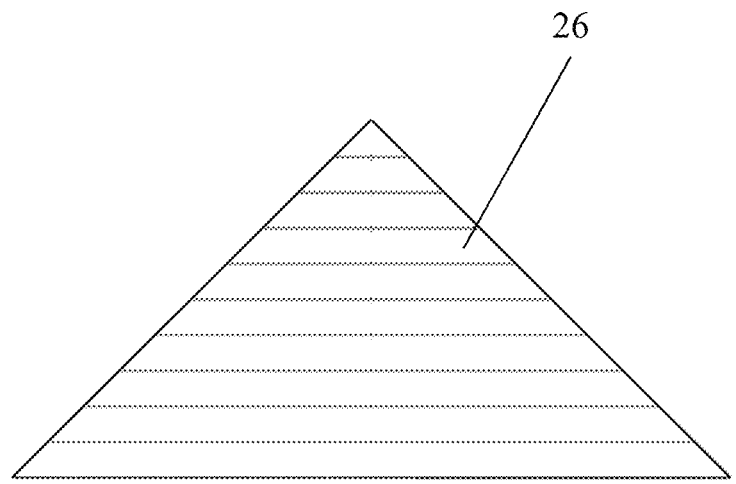
FIG. 3G and FIG. 3H illustrate perspective view and lateral view of a fourth embodiment of a positioning component for automatically and precisely positioning the robotic arm of the present disclosure, respectively.
Figure 3H:
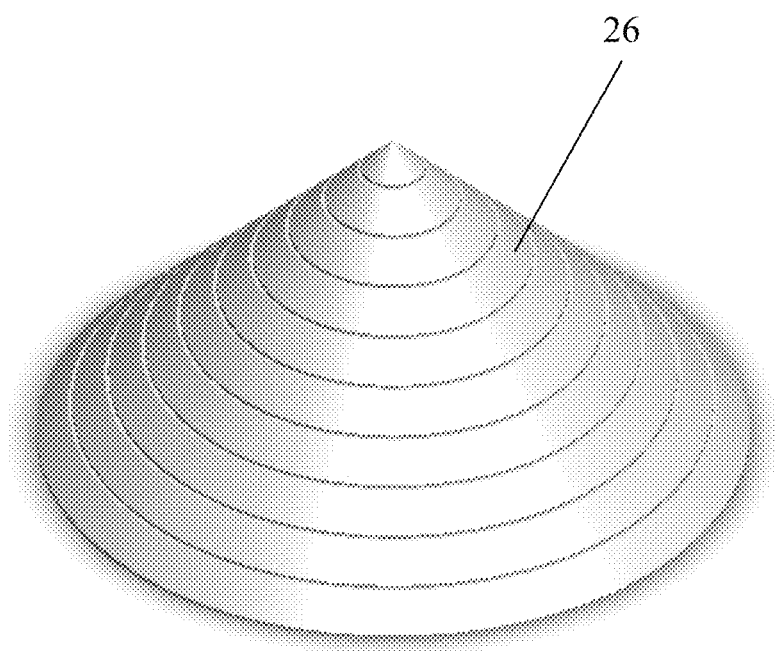

Next, please refer to FIG. 3A and FIG. 3B, FIG. 3C and FIG. 3D, FIG. 3E and FIG. 3F, and FIG. 3G and FIG. 3H. The FIG. 3A and FIG. 3B illustrate perspective view and lateral view of a first embodiment of the positioning device for automatically and precisely positioning the robotic arm of the present disclosure. The FIG. 3C and FIG. 3D illustrate perspective view and lateral view of a second embodiment of a positioning component for automatically and precisely positioning the robotic arm of the present disclosure, respectively. FIG. 3E and FIG. 3F illustrate perspective view and lateral view of a third embodiment of a positioning component for automatically and precisely positioning the robotic arm of the present disclosure, respectively. FIG. 3G and FIG. 3H illustrate perspective view and lateral view of a fourth embodiment of a positioning component for automatically and precisely positioning the robotic arm of the present disclosure, respectively.

As shown in FIG. 3A and FIG. 3B, a lateral contour of the positioning device 20 of the first embodiment is a semi-circular having a radius r. When the practical positioning device 20 is used to replace the positioning device 20 whose surface is the inclined plane with angle θ of inclination, the geometric feature of the positioning device 20 of the first embodiment is $d_{xy}^2 + d_z^2 = r^2$. When the probe 12 of the robotic arm 10 exerts the force F to touch any point on the surface of the positioning device 20, the slope of the surface of the positioning device 20 is $$\frac{\Delta_z}{\Delta_{xy}},$$

the counterforce F0 is separated to a $F_{xy}$ component and a $F_z$ component along the XY axis and Z axis, and the ratio of the $F_{xy}$ and $F_z$ components is cot θ, $$\theta = \cos^{-1}\frac{F_{xy}}{F_z} = \cos^{-1}\frac{\Delta_{xy}}{\Delta_z},$$

that is, the touching position between the positioning device 20 and the probe 12 of the robotic arm is $d_{xy} = r \times \cos \theta$ and $d_z = r \times \sin \theta$.

As shown in FIG. 3C and FIG. 3D, a lateral contour of the positioning device 22 of the second embodiment is a parabola. When such practical positioning device 22 is used to replace the positioning device 22 whose surface is the inclined plane with angle θ of inclination, the geometric feature of the positioning device 22 of the second embodiment is $d_z = h + a \times d_{xy}^2$. When the probe 12 of the robotic arm 10 exerts the force F to touch any point on the surface of the positioning device 22, the slope of the surface of the positioning device 22 is $$\frac{\Delta_z}{\Delta_{xy}},$$

the counterforce $F_0$ is separated to a $F_{xy}$ component and a $F_z$ component along the XY axis and Z axis, and the ratio of the $F_{xy}$ and $F_z$ components is $2 \times a \times d_{xy}$, that is, the touching position between the positioning device 22 and the probe 12 of the robotic arm is $$d_{xy} = \frac{1}{2 \times a} \times \frac{\overrightarrow{F_{xy}}}{\overrightarrow{F_z}}$$

and $d_z = h + a \times d_{xy}^2$.

As shown in FIG. 3E and FIG. 3F, a lateral contour of the positioning device 24 of the third embodiment is a parabola. When such practical positioning device 24 is used to replace the positioning device 24 whose surface is the inclined plane with angle θ of inclination, the geometric feature of the positioning device 24 of the third embodiment is $d_z = a \times \cos d_{xy}$. When the probe 12 of the robotic arm 10 exerts the force F to touch any point on the surface of the positioning device 24, the slope of the surface of the positioning device 24 is $$\frac{\Delta_z}{\Delta_{xy}},$$

the counterforce $F_0$ is separated to a $F_{xy}$ component and a $F_z$ component along the XY axis and Z axis, and the ratio of the $F_{xy}$ and $F_z$ components is $d_z = a \times \cos d_{xy}$, the touching position between the positioning device 24 and the probe 12 of the robotic arm is $$d_{xy} = \sin^{-1}\left(\frac{1}{a} \times \frac{\overrightarrow{F_{xy}}}{\overrightarrow{F_z}}\right)$$

and $d_z = a \times \cos d_{xy}$.

As shown in FIG. 3G and FIG. 3H, a lateral contour of the positioning device 26 of the fourth embodiment is a parabola. When such practical positioning device 26 is used to replace the positioning device 26 whose surface is the inclined plane with angle θ of inclination, the geometric feature of the positioning device 26 of the fourth embodiment is $d_z = a \times d_{xy}$. When the probe 12 of the robotic arm 10 exerts the force F to touch any point on the surface of the positioning device 26, the slope of the surface of the positioning device 26 is $$\frac{\Delta_z}{\Delta_{xy}},$$

the counterforce $F_0$ is separated a $F_{xy}$ component and $F_z$ component along the XY axis and Z axis, and the ratio of the $F_{xy}$ and $F_z$ components is a, that is, the touching position between the positioning device 26 and the probe 12 of the robotic arm is $d_z = d_{xy} =$ undetermined.

Therefore, the control computing apparatus 30 can compute the distance between the geometric center of the touched positioning device 20, 22, 24 or 26 and the coordinate origin according to the geometric features of the touched positioning device 20, 22, 24 or 26, and then precisely position the robotic arm 10 according to moment variations of axes and the distance between the geometric center of the touched positioning device 20, 22, 24 or 26 and the coordinate origin.

Figure 4:
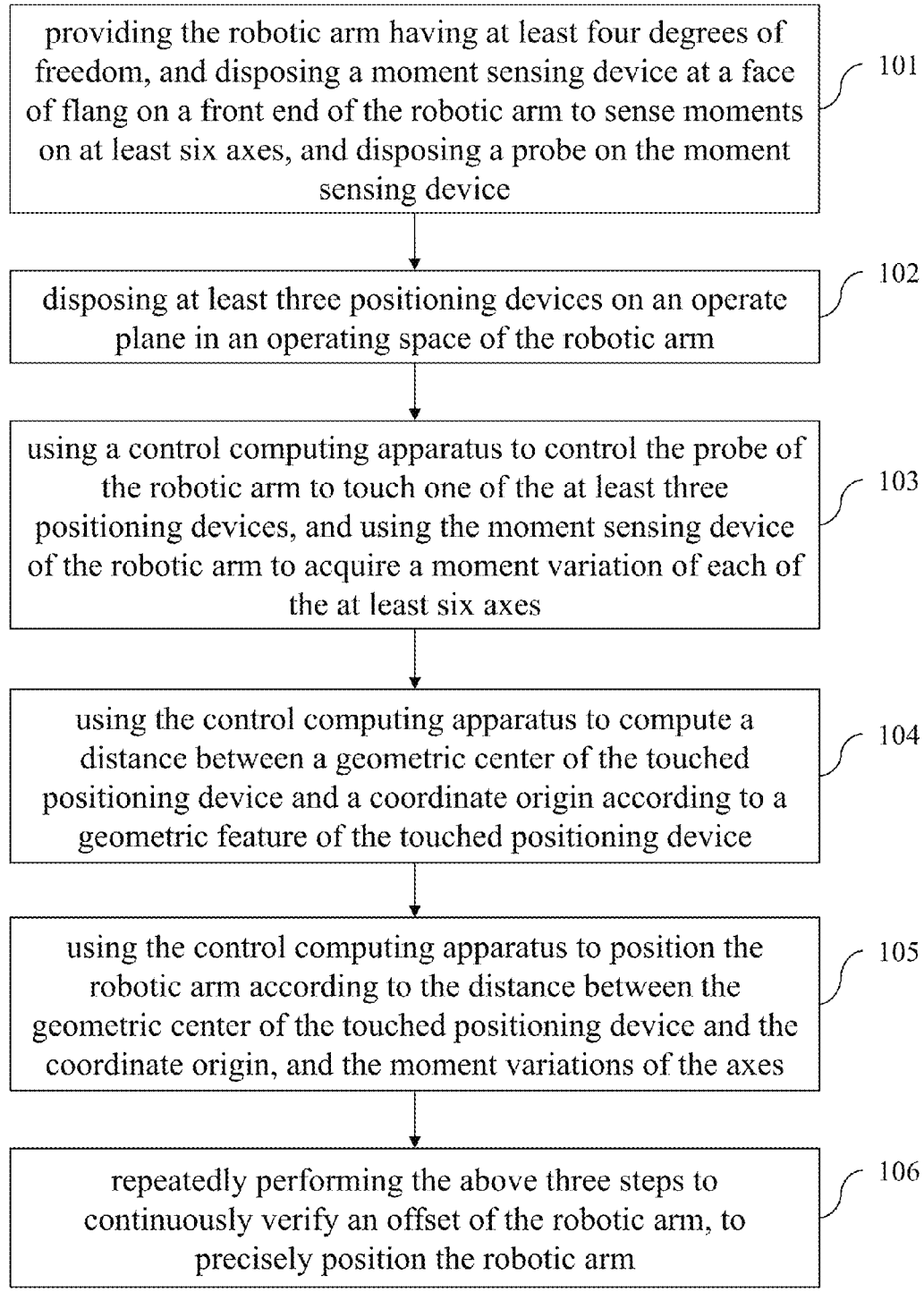
FIG. 4 illustrates a flow diagram of a method for automatically and precisely positioning a robotic arm of the present disclosure.

Please refer to FIG. 4 which illustrates a flow diagram of a method for automatically and precisely positioning a robotic arm of the present disclosure.

In step 101, the robotic arm 10 utilized in the present disclosure has at least four degrees of freedom. The moment sensing device 11 is disposed at a face of flange on a front end of the robotic arm 10, and the face of flange is an interface for installing different tool with the robotic arm 10. The moment sensing device 11 is configured to sense moments of at least six axes. The probe 12 is disposed on the moment sensing device 11 and configured for touching a positioning device 20.

In step 102, at least three positioning devices 20 are disposed on an operate plane in an operating space of the robotic arm 10. In step 103, the control computing apparatus 30 is used to control the probe 12 of the robotic arm 10 to touch one of the positioning devices 20. When the probe 12 touches one of the positioning devices 20, the moment sensing device 11 of the robotic arm 10 acquires a moment variation of each of the axes and provides the moment variations to the control computing apparatus 30. In step 104, the control computing apparatus 30 computes a distance between a geometric center of the touched positioning device 20 and a coordinate origin according to a geometric feature of the touched positioning device 20. Next, in step 105, the control computing apparatus 30 positions the robotic arm 10 according to the moment variations of the axes and the distance between the geometric center of the touched positioning device 20 and the coordinate origin. In a step 106, the step 103 through the step 105 are repeatedly performed to continuously verify an offset of the robotic arm 10, so as to precisely position the robotic arm 10.

To sum up, the difference between the present disclosure and the traditional technology is that the control computing apparatus of the present disclosure controls the probe of the robotic arm to touch one of the positioning devices, and acquires a moment variation of each of the axes from the moment sensing device of the robotic arm, and then computes the distance between the geometric center of the touched positioning device and the coordinate origin according to the geometric feature of the touched positioning devices, and then positions the robotic arm according to the moment variations of the axes and the distance between the geometric center of the touched positioning device and the coordinate origin.

Applying this technology solution can solve the existing problems of complicated robotic arm and easily generating error accumulation, so as to achieve the technical effects of quickly and precisely positioning the robotic arm without error accumulation.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A system for automatically and precisely positioning a robotic arm, comprising:
   the robotic arm, having at least four degrees of freedom, and further comprising:
      a moment sensing device, disposed at a face of a flange of a front end of the robotic arm, and configured for sensing moments of at least six axes; and
      a probe, disposed on the moment sensing device;
   at least three positioning devices, disposed on an operating plane in an operating space of the robotic arm; and
   a control computing apparatus, configured for controlling the probe of the robotic arm to touch one of the positioning devices, wherein when the control computing apparatus controls the probe to touch one of the positioning devices once, the moment sensing device of the robotic arm acquires a moment variation of each of the axes and provides the moment variations to the control computing apparatus, the control computing apparatus computes a distance between a geometric center of the touched positioning device and a touching point where the probe touches the one of the positioning devices according to a geometric feature of the touched positioning device, and then precisely positions the robotic arm according to the moment variations of the axes and the distance between the geometric center of the touched positioning device and the touching point where the probe touches the one of the positioning devices.

2. The system as defined in claim 1, wherein each of the at least three positioning devices has a lateral contour in a semi-circular, parabola, cosine or triangle shape.

3. The system as defined in claim 1, wherein the at least three positioning devices are disposed at different positions in the operating space of the robotic arm, and any three of the at least three positioning devices are non-collinear.

4. The system as defined in claim 1, wherein the moment sensing device is configured for sensing forces on a X axis, Y axis and Z-axis and sensing torques on the X axis, the Y axis and the Z-axis.

5. The system as defined in claim 1, wherein the probe has a diameter smaller than one tenth of a diameter of one of the at least three positioning devices.

6. A method for automatically and precisely positioning a robotic arm, comprising:
   providing the robotic arm having at least four degrees of freedom, and disposing a moment sensing device at a face of a flange of a front end of the robotic arm to sense moments on at least six axes, and disposing a probe on the moment sensing device;
   disposing at least three positioning devices on an operate plane in an operating space of the robotic arm;
   using a control computing apparatus to control the probe of the robotic arm to touch one of the at least three positioning devices, and using the moment sensing device of the robotic arm to acquire a moment variation of each of the at least six axes when the control computing apparatus controls the probe to touch one of the positioning devices once;
   using the control computing apparatus to compute a distance between a geometric center of the touched positioning device and a touching point where the probe touches the one of the positioning devices according to a geometric feature of the touched positioning device;
   using the control computing apparatus to position the robotic arm according to the distance between the geometric center of the touched positioning device and the touching point where the probe touches the one of the positioning devices, and the moment variations of the axes; and
   repeatedly performing the above three steps to continuously verify an offset of the robotic arm, to precisely position the robotic arm.

7. The method as defined in claim 6, wherein in the step of disposing the at least three positioning devices on the operate plane in the operating space of the robotic arm, each of the at least three positioning devices has a lateral contour in a semi-circular, parabola, cosine or triangle shape.

8. The method as defined in claim 6, wherein in the step of disposing the at least three positioning devices on the operate plane in the operating space of the robotic arm, the at least three positioning devices are disposed at different positions in the operating space of the robotic arm, and any three of the at least three positioning devices are non-collinear.

9. The method as defined in claim 6, wherein in the step of using the control computing apparatus to control the probe of the robotic arm to touch one of the positioning devices and using the moment sensing device of the robotic arm to acquire a moment variation of each of the at least six axes, the moment sensing device is configured for sensing forces on a X axis, Y axis and Z-axis and sensing torques on the X axis, Y axis and Z-axis.

10. The method as defined in claim 6, wherein in the step of using the control computing apparatus to control the probe of the robotic arm to touch one of the positioning devices and using the moment sensing device of the robotic arm to acquire the moment variation of each of the at least six axes, the probe has a diameter smaller than one tenth of a diameter of one of the at least three positioning devices.

* * * * *